June 19, 1928. 1,674,133

J. D. FESTARY

ENDLESS TREAD

Filed July 25, 1924   2 Sheets-Sheet 1

INVENTOR.
J. D. Festary
BY
Langner, Parry, Card & Langner
ATTORNEYS.

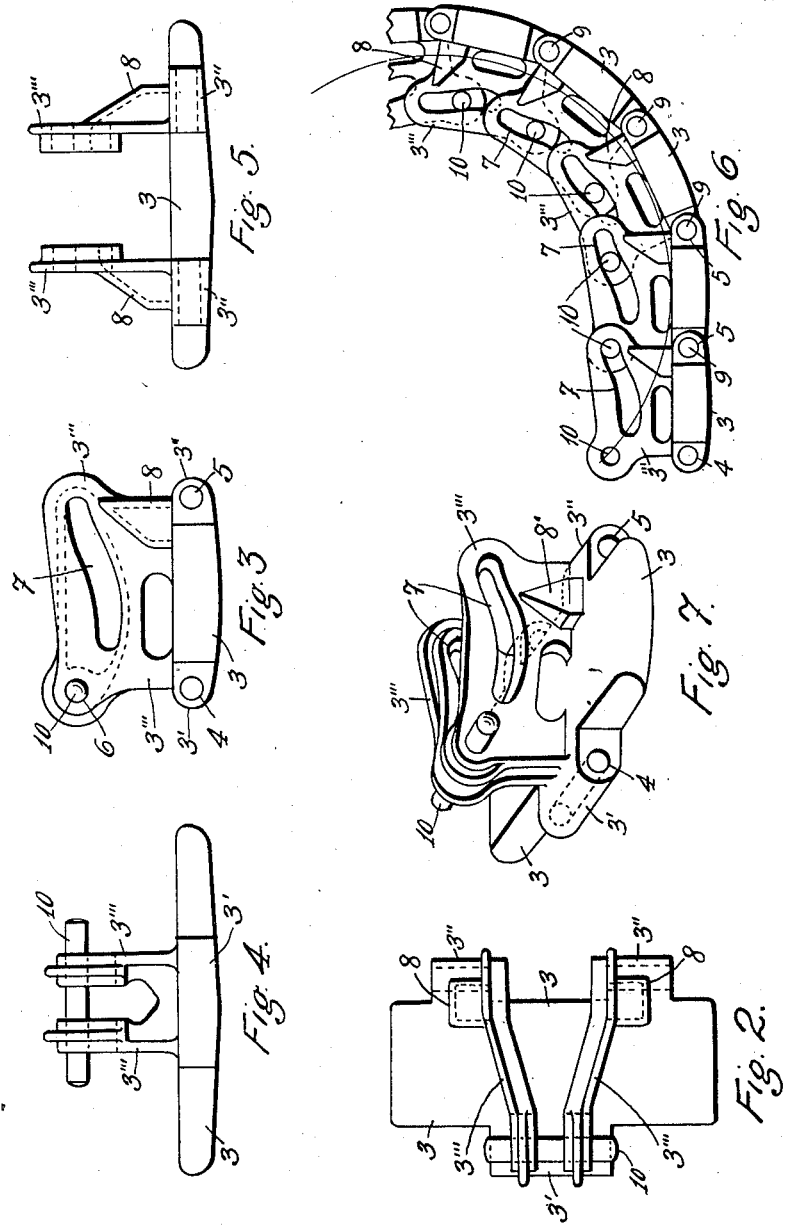

UNITED STATES PATENT OFFICE.

JOSE D. FESTARY, OF SANTIAGO DE CUBA, CUBA, ASSIGNOR OF ONE-HALF TO MOORE AND MOORE, INC., OF READING, PENNSYLVANIA, A CORPORATION OF PENNSYLVANIA.

ENDLESS TREAD.

Application filed July 25, 1924, Serial No. 728,205, and in Cuba June 25, 1924.

This invention relates to an endless tread for vehicle wheels and has for its purpose to afford an endless tread of a construction which prevents undue friction between the tread and the wheels to which it is applied thereby preventing wear and postponing breakdown and repairs of the tread. This type of tread is of particular advantage on rough and muddy ground.

A further purpose of the invention is to produce an endless tread the links of which will remain in horizontal alignment at the portions between the two wheels to which it is applied, while readily pivoting on each other to provide sufficient slack adjacent the driving wheels so as to prevent undue friction between the wheels and the tread.

Further advantages resulting from the novel tread are a reduction in the cost of its production, a simplification in the construction of devices of this character and an increased life and efficiency over former devices of the kind.

The accompanying drawings show one operative embodiment of the invention merely by way of illustration.

In the drawings,

Figure 2 is an inner plan view of one of the links of the tread.

Figure 3 is a side elevation of one of the tread links.

Figures 4 and 5 are end elevations respectively of opposite ends, of one of the tread links.

Figure 6 is a side elevation of a portion of assembled tread showing the link connections and movements and Figure 7 is a perspective view of one of the tread links furnished with a slightly different form of guide block.

Figure 1:
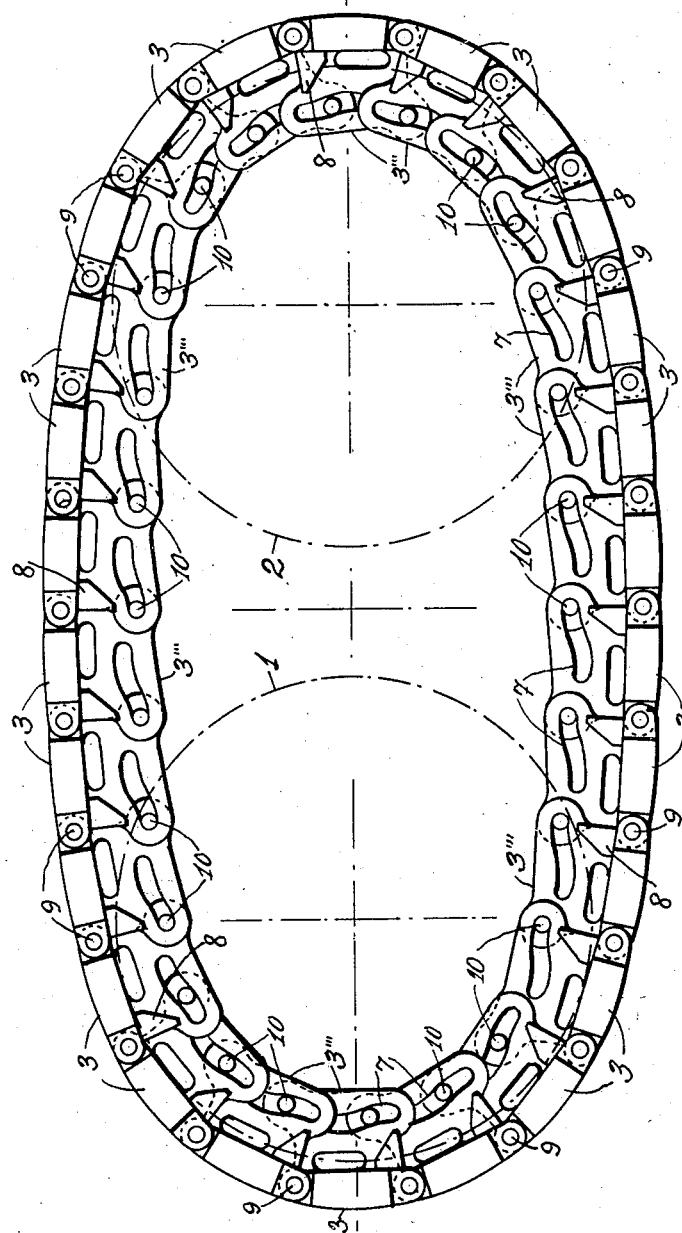
Figure 1 is a diagrammatic side elevation of the complete tread as applied to the driving wheels.

In Figure 1 the drive wheels on one side of a vehicle are indicated at 1 and 2 and around these wheels is fitted the endless tread formed of separate links 3 pivoted as shown in the drawing to form the continuous tread.

The links 3 are all exact duplicates and are clearly shown in Figures 2, 5 and 7.

Each link comprises a plate portion 3 having a slightly curved outer surface for forming a part of the tread surface of the endless band. At one side of plate 3 is a projecting ear 3' having a bore 4 therein while at the other side of the plate are spaced projecting ears 3" with aligned bores 5, the ears 3" being spaced to snugly accommodate the ear 3' of an adjacent link when in assembled position.

On the inner surface of the plate 3 each link has two projecting ribs 3''' with diverging intermediate portions and parallel end portions as clearly shown in Figure 2. The end portions are positioned above the ears 3' and 3". In the parallel end portions of the ribs 3''' which are above the ear 3', there are aligned bores 6 for receiving a connecting pin 10 while the other parallel ends of the ribs are supplied with curved opposed guide slots 7 for slidingly receiving the ends of the pins 10 when in assembled position.

Small guide blocks 8 are provided at the outer side of each of the ribs 3''' at the more widely spaced ends, for guiding the travel of the wheels 1 and 2.

In the showing of Figure 7 the guide block, designated as 8', is of slightly different form from that shown in the other figures.

The links are connected together as shown in Figure 6 by placing an ear 3' of one link between the spaced ears 3" of an adjacent link and passing a connecting pin 9 through the aligned bores 4 and 5. Each link is also connected to the adjacent link by passing a connecting pin 10 through one of the slots 7 of a rib 3''', then through the bores in the closer spaced parallel ends of the ribs of the adjacent link and then through the opposed slot 7 of the first link, as is clearly to be seen from Figures 6 and 7.

When connected in this manner the links are pivoted one to the other by stationary pivots 9 and by movable pivots 10 so as to permit a sliding of the pins 10 of one link in the slots 7 of a connected link so as to permit the endless tread to readily conform with the contour of the drive wheels 1 and 2 while being held substantially horizontal between the drive wheels. As explained above this construction permits proper operation of the tread while eliminating undue friction between the tread member and the drive wheels and also between the separate links constituting the tread member.

Having now described one operative em- bodiment of the invention merely by way of illustration I now claim:—

1. An endless tread comprising, a plurality of articulated elements, each element including, a tread member, centrally positioned projecting ribs on the element, a bearing portion at each side of the ribs for receiving drive wheels for the tread, separate perforated lugs projecting from the said element in a plane parallel with the tread member, said ribs being bored and slotted for receiving a fixed and a slidable axle respectively and positioned at right angles to said tread member, said ribs being arranged parallel to each other at their ends and divergent at their central parts.

2. An endless tread comprising, a plurality of articulated elements, each element including, a tread member, centrally positioned projecting ribs on the element, a bearing portion at each side of the ribs for receiving drive wheels for the tread, a wheel guiding abutment on said element positioned against the outer side of each of said projecting ribs, separate perforated lugs projecting from the said element in a plane parallel with the tread member, said ribs being bored and slotted for receiving a fixed and a slidable axle respectively and positioned at right angles to said tread member, said ribs being arranged parallel to each other at their ends and divergent at their central parts.

3. An endless tread belt comprising a plurality of links connected end to end, each link comprising a tread portion and an inward extension arranged substantially midway between the side edges of the tread portion and being provided at one end with a fork and at the opposite end with a portion complementary to the fork, the complementary portion of one link extending into the fork of the adjacent link, slot and pin connections joining the forks and complementary portions, and means pivotally connecting the tread portions of the links.

In testimony whereof I have signed my name to this specification.

JOSE D. FESTARY.